UNITED STATES PATENT OFFICE.

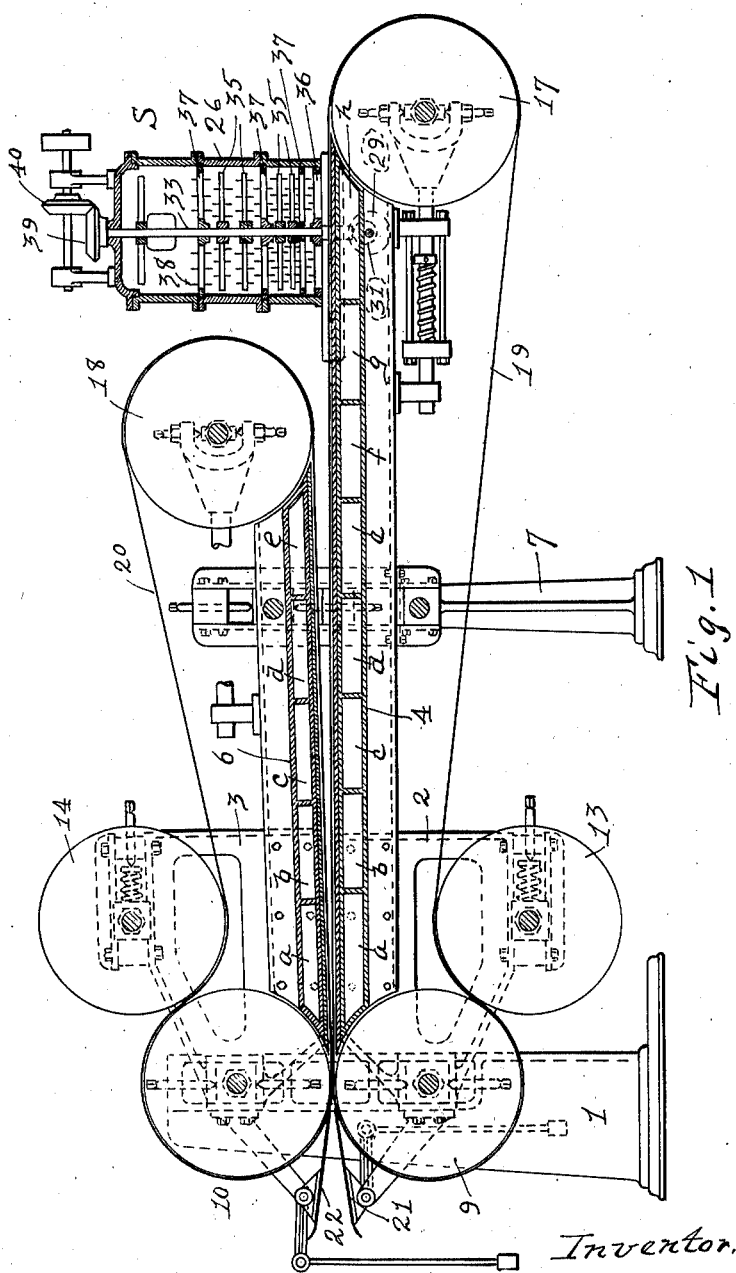

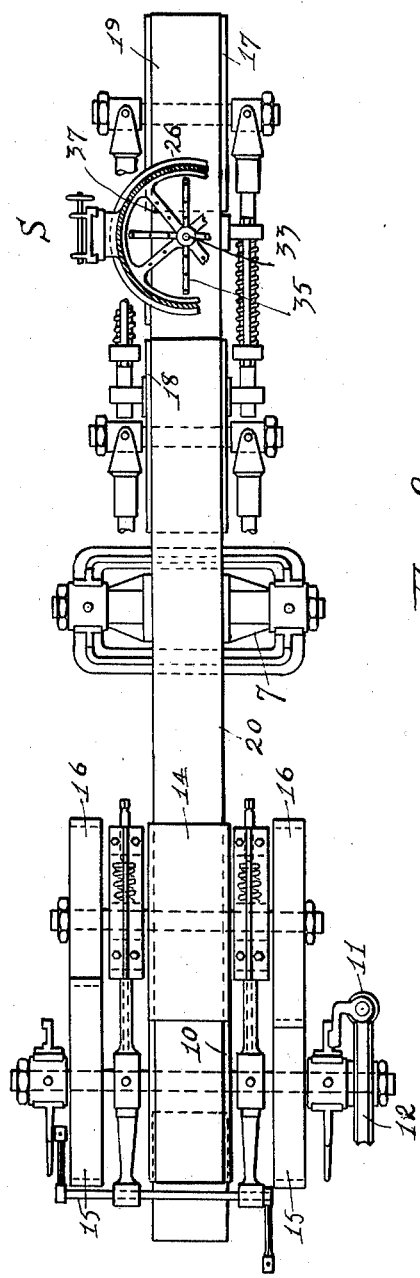

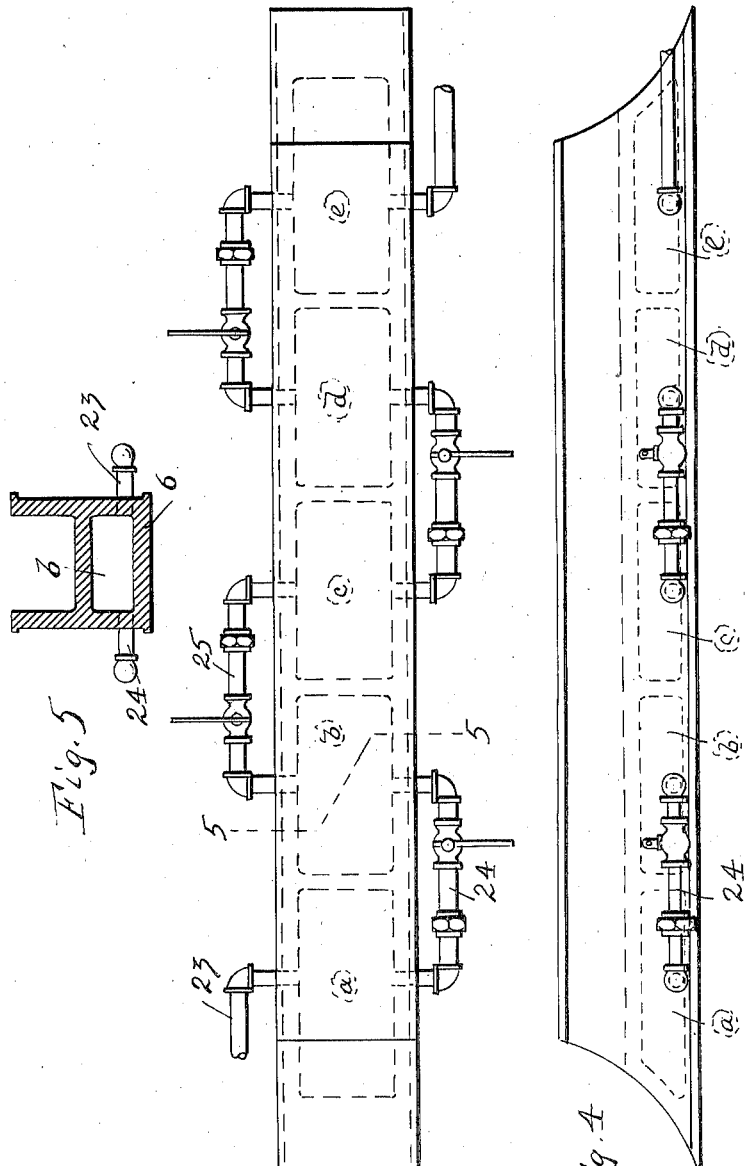

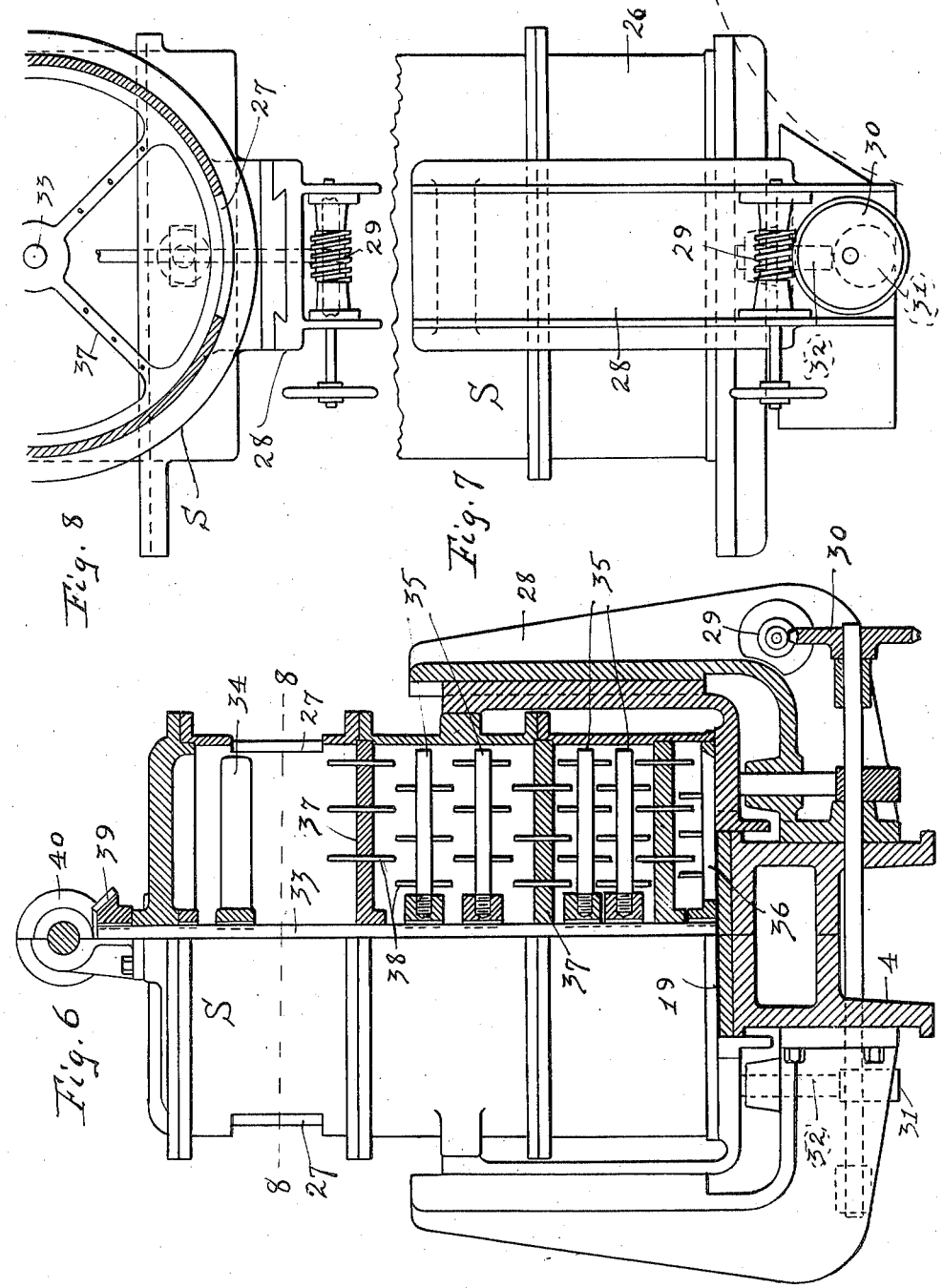

JOSEPH PORZEL, OF BUFFALO, NEW YORK, ASSIGNOR TO CITY TRUST COMPANY, OF BUFFALO, NEW YORK.

VULCANIZING-MACHINE.

1,308,111.     Specification of Letters Patent.     Patented July 1, 1919.

Application filed January 9, 1918. Serial No. 211,087.

*To all whom it may concern:*

Be it known that I, JOSEPH PORZEL, a citizen of the United States, residing at Buffalo, in the county of Erie and State of New York, have invented new and useful Improvements in Vulcanizing-Machines, of which the following is a specification.

This invention relates to vulcanizing machines, and more especially continuous vulcanizing machines.

The several objects of this invention are, first to provide mechanical means for carrying out the process of my application of even date herewith, Serial No. 211,086, wherein is shown my process of continuous and progressive vulcanization by the method therein claimed. A second object is to provide mechanism whereby rubber prepared for vulcanization and capable of being spread upon a belt or surface may be progressively heated and progressively compressed to form a sheet or fabric of rubber in vulcanized form. A third object is to provide means whereby molds may be carried on a continuously traveling belt and in like manner vulcanized. Other and further objects will be evident from the following specifications and claims and from the drawings in which,—

Figure 1 is a side elevation partly in section with portions of the mechanism and details of construction omitted for clearness.

Fig. 2 is a plan view of similar character.

Fig. 3 is an enlarged plan view of the upper platen, showing the heating connections.

Fig. 4 is a similar view in side elevation.

Fig. 5 is a section on 5—5 of Fig. 3.

Fig. 6 is an enlarged view of the spreading mechanism, the left-hand part being shown in elevation and the right-hand part in central section.

Fig. 7 is a detail elevation at right angles to Fig. 6.

Fig. 8 is a detail section on 8—8 of Fig. 6.

I will first describe the principal features of the apparatus by reference to Figs. 1 and 2, and for convenience of description I will designate the left-hand end of the machine as shown in Figs. 1 and 2 as the front, and the right-hand end as the rear of the machine.

A heavy pedestal casting 1 at the front of the machine carries the large bracket extensions 2 and 3. To the bracket 2 is bolted the platen 4 and to the bracket 3 is bolted the platen 6. The platens 4 and 6 are adjustably supported by pedestal 7. The bolting of the platens 4 and 6 to the brackets 2 and 3 is such that, by loosening the bolts the two platens may be adjusted up and down at the pedestal 7. As will be seen in Fig. 1, the faces of the platens 4 and 6 are at a small angle; and in this figure the angle is shown much larger than in actual practice, and the length of the platen 4 is much shortened.

Journaled at the front of the machine are two drums 9 and 10, of equal diameter and driven at equal speed by any desired means, as by worms 11 and gears 12, as seen in Fig. 2. Journaled in adjustable bearings on the brackets 2 and 3 are drums 13 and 14, which are also positively and equally driven by any desired means, as by gears 15 and 16 on both ends of the drum-shafts, as shown in Fig. 2.

Adjustably mounted in a bearing carried by the platen 4 is an idler-drum 17, and similarly mounted upon the platen 6 is an idler drum 18.

An endless steel belt 19, the width of the platen 4, travels over the face of the platen 4, about the drum 9, over the drum 13 and about the idler-drum 17. A similar belt 20 travels under the face of the platen 6, over the drum 10, under the drum 14 and around the idler-drum 18. The platens 4 and 6 are heated, as will be hereafter more fully described; and mounted over the platen 4 is a feeding and spreading device, generally designated by S and hereafter more fully described. Weighted scrapers 21 and 22 contact the belts 19 and 20, respectively just outside the nearest line of contact of the said belts to free the rubber sheet as it comes out of the machine.

It being understood that the drums 9 and 10 rotate in opposite directions, so that the belts 19 and 20 travel in the same direction, it being understood that the platens 4 and 6 are heated and progressively heated more highly toward the front of the machine, or in some cases equally heated, and it being understood that rubber in granular, powdered, or otherwise spreadable form is fed down and spread upon the belt 19 by the spreader S,—the operation is as follows: As the rubber thus ready for vulcanization is thus spread upon the belt 19 and by said belt is slowly carried forward, it is gradually heated until it comes under the belt 20 traveling under the face of the platen 6. From this point, due to the angular position of the platens 4 and 6, the rubber is not only further heated but is compressed between the two belts 19 and 20, and continues to be further heated and compressed until, by the time it reaches the release point at the forward end of the platens 4 and 6, it is fully compressed and fully vulcanized.

As the sheet rubber leaves the machine, it may be wound upon a wind-up roll, or cut into sheets, or otherwise used as may be desired.

From this general description the essence of my invention will be understood which is: means for spreading rubber in vulcanizable form upon a belt traveling over a platen, means for heating the platen and thus preheating the rubber, means comprising a second belt and a second platen so positioned and arranged as to further heat and at the same time compress the rubber, and means for continuing such heating and compressing until the rubber is formed into a properly compressed and vulcanized sheet or web.

Referring now especially to Figs. 3, 4, and 5, I will describe the means for heating the platens 4 and 6, by showing the method of heating the platen 6 only, since the means for heating the other platen is substantially identical. The platens are subdivided interiorly into steam or hot fluid chambers, shown in section in Figs. 1 and 5 and in broken outline in Figs. 3 and 4. These chambers are designated as $a, b, c, d, e$, etc. The steam or other heated fluid enters the chamber $a$ from a pipe 23, a valved pipe 24 carries it to chamber $b$, and a valved pipe 25 carries it to the chamber $c$, and so on. The valves employed may be hand-valves or pressure-control valves, as desired—the end being to attain the desired high point of vulcanization in the vicinity of the chamber $a$ and gradually reducing the temperature toward the rear of the machine, so that at the point where the rubber is spread upon the belt, the temperature will be sufficient only to preheat the rubber.

I will now describe certain other features of the mechanism, which are of importance in carrying out my invention.

The bearings of the drums 9 and 10 are, as shown in broken outline in Fig. 1, vertically adjustable. This is for the purpose both of adjusting the surfaces of the drums to the plane surfaces of the platens 4 and 6, and also for the purpose of adapting the machine to the production of rubber sheets of different thicknesses.

The bearings of the drums 13 and 14 are horizontally adjustable to regulate their proximity to the drums 9 and 10 and also to maintain such proper proximity when the drums 9 and 10 are adjusted to different positions to produce sheets of various thicknesses.

The bearings of the idler-drums 17 and 18 are adjustable both horizontally and vertically; vertically to place them in proper adjustment to the planes of the platens 4 and 6 and horizontally by spring yielding adjustment to regulate the tension of the belts 19 and 20.

The spreading and feeding device consists of a cylindrical body or barrel 26 which receives the rubber from any desired source through the openings 27. This cylindrical body is mounted slidably vertically in dovetail supports 28 to regulate the thickness of the spreading of the rubber. These supports are rigidly mounted on the platen 4. The vertical adjustment is effected by means of a worm 29 and a gear 30, which gear 30 is on a shaft rigid with a cam 31 which engages with a lug 32 on said cylindrical body. By rotation of the worm 29 the cam 31 raises or lowers the said body and thus regulates the thickness of the spreading of the rubber on the belt.

Within the body 26 is a shaft 33 upon which and mounted in rotation with it a paddle 34 which works the rubber down, stirrers or mixers 35, and a spreader and leveler 36. Within this body are spiders 37 which are rigid with the body. Both the mixers 35 and the spiders 37 have vertical pins or projections 38 which assist in the stirring and mixing operation.

The spreader or leveler 36 has knife edged arms which level up the rubber upon the belt, and the shaft 33 is driven from any source of power, as by gears 39 and 40.

The spreading and leveling is thus effected continually, and evenly as the belt passes under the spreader.

This is a typical form of spreading and leveling means, but other well known forms of spreading or leveling devices may be employed.

While I have described my invention as adapted to vulcanizing and forming rubber in sheets, I do not limit the same thereto, since it is evident that the same is adaptable to the plastic rubber art and other processes where progressive compression, or heating, or both, is applied to any substance. Also, in certain uses where the material is otherwise spread, the platens may be in parallel plane, and used to compress or heat or both, as in the case of belting and coated fabrics to be vulcanized.

Having thus described my invention, I claim:

1. In a machine of the type described, the combination with two metal belts arranged one above the other, drums for driving said belts and drums for tensioning said belts, of platens, arranged within the reaches of said belts and adapted to holding said belts in slightly converging planes of travel, chambers in said platens for the heating fluid, valved connections between said chambers for regulating the pressure of the fluid therein progressively from front to rear end of said platens, adjusting means for regulating the angularity of the surfaces of said platens and a spreading device for spreading rubber upon the surface of one of said belts.

2. In a machine of the type described, the combination with two metal belts arranged one above the other, drums for driving said belts and drums for tensioning said belts, of platens arranged within the reaches of said belts and adapted to holding said belts, in plane, chambers in said platens for heating fluid, valved connections between said chambers for regulating the pressure of the fluid therein progressively from front to rear end of said platens, adjusting means for regulating the angularity of the surfaces of said platens and a spreading device for spreading rubber upon the surface of one of said belts.

3. In a machine of the type described, in combination with driving and tensioning drums, two metal belts carried by said drums and placed one above the other, platens backing said reaches of said belts and adapted to form a wedge shaped space between the adjacent faces of said belts, chambers within said platens adapted to receive a heating fluid, means for regulating the temperature of said platens from a vulcanizing temperature at the front end downwardly to a preheating temperature at the rear ends whereby rubber is preheated and progressively heated to the vulcanizing point, and a spreader for delivering and spreading rubber in a vulcanizable state upon one of said belts.

4. In a machine of the type described, in combination with driving and tensioning drums, two metal belts carried by said drums and placed one above the other, platens backing said reaches of said belts and adapted to hold the belts in plane, chambers within said platens adapted to receive a heating fluid, means for regulating the temperature of said platens from a vulcanizing temperature at the front end downwardly to a preheating temperature at the rear ends whereby rubber is preheated and progressively heated to the vulcanizing point, and a spreader for delivering and spreading rubber in a vulcanizable state upon one of said belts.

5. In a machine of the type described, in combination with driving and tensioning drums, metal belts carried by said drums one placed above the other and the lower of said belts extending rearwardly and sufficient distance beyond the upper belt to attain preheating of the rubber before the compressing and vulcanizing actions are commenced, and platens for supporting the adjacent reaches of said belts and converging slightly toward the front end of the machine, heating means and heat regulating means for said platens whereby the same are kept at vulcanizing temperature adjacent the front ends and progressively lower temperatures toward their rear ends, means for regulating the angularity of said platens and a spreading device for spreading the rubber upon the lower belt adjacent to its rear end whereby the rubber so spread is progressively preheated before compression between said belts and whereby the heating and compressing is progressively increased until the compression and vulcanization is complete at the front or discharge end of the machine.

6. In combination with the elements set forth in claim five, a stirring and spreading mechanism in said spreading device comprising a shaft journaled therein and means for driving said shaft, stirring arms rigid on said shaft, spiders rigid with the spreader body and interposed between said stirring members and a leveler mounted upon and in rotation with said shaft adjacent its lower end for leveling the rubber as it is worked down and delivered upon the face of the belt.

JOSEPH PORZEL.